July 15, 1952   J. J. KOJAN   2,603,382

CLAMPING RING FOR METAL DRUM CLOSURES

Filed Sept. 15, 1948

INVENTOR.
JOHN J. KOJAN
BY Hudson, Boughton,
Williams, David & Hoffman
ATTORNEYS Patented July 15, 1952

2,603,382

UNITED STATES PATENT OFFICE 2,603,382

CLAMPING RING FOR METAL DRUM CLOSURES

John J. Kojan, Bedford, Ohio, assignor to Drum Parts, Inc., Cleveland, Ohio, a corporation of Ohio Application September 15, 1948, Serial No. 49,407

2 Claims. (Cl. 220—61)

This invention relates to improvements in clamping rings for metal drums. Sheet metal drums are subject to some variation in diameter. Accordingly, the clamping rings with which they are closed and sealed cannot be constructed to exact size such that the ends of the ring will come exactly together when the ring is contracted upon the drum and, in practice, the rings are made short enough so that they may be drawn down tightly into sealing condition on any given drum without the ends of the ring meeting. This leaves a short gap of ½" to 1" or more where the sealing gasket is not subjected to direct pressure from the ring, and this may cause leakage in the event that the drum is dropped head first upon a hard surface. By the present invention the gap between the ends of the ring is eliminated and the sealing of the drum is effectively accomplished throughout its periphery.

One of the objects of the invention, therefore, is the provision of a clamping ring for steel drums which shall afford sealing pressure substantially throughout the perimeter of the drum.

Other objects and features of novelty will appear as I proceed with the description of those forms of the invention which for the purposes of the present application I have illustrated in the accompanying drawing, in which.

Figure 1:
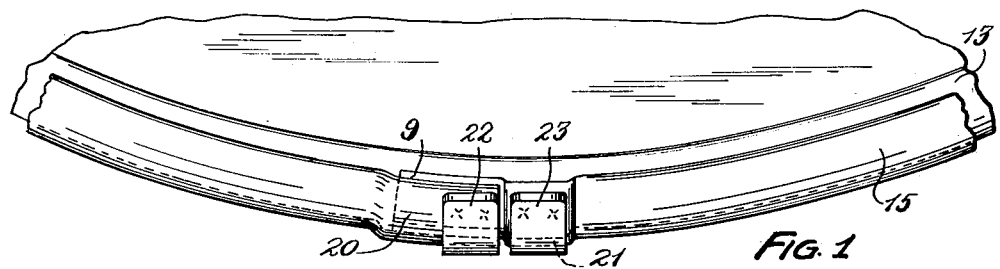
Fig. 1 is a fragmental plan view of the lid or cover of a steel drum with my clamping ring in closing position thereupon.
Figures 2, 3, 4:
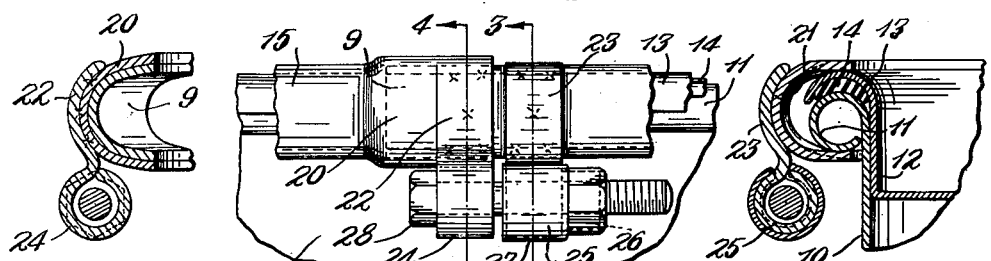
Fig. 2 is a fragmental elevational view showing the drum and the sealing ring in closed position.
Figures 5, 7:
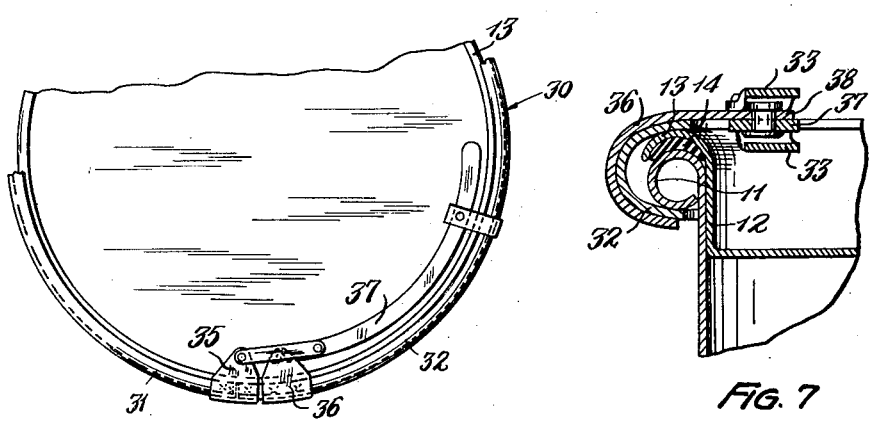
Figure 6:
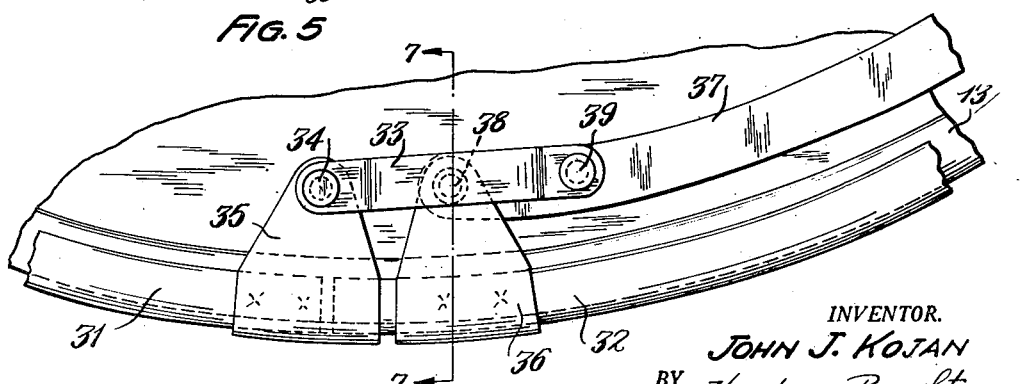

Figs. 3 and 4 are fragmental vertical sectional views taken substantially on the lines 3—3 and 4—4 respectively of Fig. 2;

Fig. 5 is a plan view on a smaller scale showing the invention applied to a link and lever type closing ring;

Fig. 6 is a similar view on a larger scale, and

Fig. 7 is a vertical sectional view taken substantially on the line 7—7 of Fig. 6.

Referring first to Figs. 1 to 4 inclusive in which the preferred form of the invention is illustrated, 10 represents the side wall of a sheet metal drum provided with an outwardly rolled bead 11 of conventional form. The lid of the drum has the usual peripheral upstanding wall 12 terminating in a curved outer rim 13 which overhangs the bead 11. A resilient gasket 14 is disposed within the rim 13 and may be secured thereto. Consequently, when the rim 13 is depressed, the gasket 14 is put under pressure and the joint between the bead 11 and the rim 13 is sealed.

Sealing pressure is applied by means of a split clamping ring 15 of C-shaped cross-section. In accordance with the present invention this pressure is applied throughout the periphery of the ring. To this end the ring is made longer than the circumference of the bead 11 and at one end there is provided an outwardly offset portion 20, the offset being equal to the thickness of the metal of the ring and having approximately the same contour. The other end 9 of the ring fits within the offset 20 and the two ends are free to slide one upon the other. The offset part 20 may therefore be referred to as the overlapping end and the part which slides within the offset 20 as the underlapping end.

Spaced backwardly somewhat from the underlapped end the metal of the ring may be struck outwardly, forming a second offset portion 21 of the same height as the offset 20. On these two offset portions there are secured as by spot welding lugs or straps 22 and 23 having depending ends which are rolled into cylindrical loops 24 and 25 respectively that come into substantial alignment when the ring is mounted on the drum. A nut 26 abuts the outer side of loop 25, being held in position by an envelope 27 of relatively thin metal which extends over the loop as well as over the nut. A bolt 28 is projected through the two loops 24 and 25 and is threaded through the nut 26. While this construction, which is covered by my copending application Serial No. 739,192, filed April 3, 1947, now Patent No. 2,486,565, is preferred, in the broader aspects of the invention any bolt and nut means may be employed for drawing the ends of the ring together and thereby camming down the rim 13 and putting the gasket 14 under sealing pressure. The offset portion 21 of the underlapped end of the ring is useful in that it permits the formation of the straps 22 and 23 as exact duplicates for maintaining the loops 24 and 25 in alignment.

The invention may also be applied to lever type rings as illustrated in Figs. 5, 6, and 7 of the drawing. In that case, however, the result is accomplished by means which is different specifically from that of the preferred form of the invention. In these figures the drum parts are given the same numerals as in the first-described form of the invention. The ring as a whole is indicated at 30, while the ends on opposite sides of the split are numbered 31 and 32. A divided link 33 of more or less conventional form is pivoted at 34 to a wide strap 35 which extends over the top of end 31 and downward and underneath its lower surface, being secured to the ring preferably by welding. It overlaps the ring end, as shown in Fig. 6 especially. The overlapping portion of strap 35 forms a guide slidably receiving the extremity of ring end 32. A second strap 36 similar to strap 35 is mounted on ring end 32 spaced away from the extremity of that end. The lever 37 is pivoted at 38 to strap 36 and at 39 to link 33. This link and lever closing means is conventional in character. In this form of the invention, it will be observed that the overlap instead of being provided by an offset in one end of the ring is provided by an overlapping portion of one of the straps which support the link and lever.

Having thus described my invention, I claim:

1. A ring clamp for fastening a cover onto the open end of a cylindrical sheet metal container, comprising a split ring of C-shaped cross-section, one end of said ring having a radially offset portion of similar cross-section overlapping the other end of the ring and adapted to slide on the latter end as the ring is contracted, and said other end having a similar offset portion beyond the overlapped portion thereof, two lugs rigid with the ring one on each of said offset portions, each of said lugs having an integral part rolled into a cylindrical loop offset from the ring, a bolt loosely received in one of said loops and adapted to extend through the other loop, and a nut adapted to bear against the last-named loop and to receive the threaded end of said bolt.

2. A ring clamp for fastening a cover onto the open end of a cylindrical sheet metal container, comprising a split ring of C-shaped cross section, one end of said ring having a radially offset portion of similar cross section overlapping the other end of the ring and adapted to slide on the latter end as the ring is contracted, and said other end having a similar offset portion beyond the overlapped portion thereof, and means carried by the offset portions on the two ends of said ring for contracting the ring.

JOHN J. KOJAN.

REFERENCES CITED

The following references are of record in the file of this patent:

UNITED STATES PATENTS

| Number | Name | Date |
|---|---|---|
| 1,570,519 | Mittinger | Jan. 19, 1926 |
| 1,792,281 | Cornell | Feb. 10, 1931 |
| 1,924,578 | Vick | Aug. 29, 1933 |
| 1,962,626 | Townsend | June 12, 1934 |
| 2,031,290 | Vaughn | Feb. 18, 1936 |
| 2,115,361 | Daggett | Apr. 26, 1938 |
| 2,303,625 | Ellis | Dec. 1, 1942 |
| 2,304,911 | Harpold | Dec. 15, 1942 |
| 2,453,492 | Carter | Nov. 9, 1948 |

FOREIGN PATENTS

| Number | Country | Date |
|---|---|---|
| 340,869 | Great Britain | Jan. 8, 1931 |
| 367,531 | Great Britain | Feb. 25, 1932 |
| 444,595 | Great Britain | Mar. 24, 1936 |
| 445,364 | Great Britain | Apr. 8, 1936 |